(12) United States Patent
Tanaka et al.

(10) Patent No.: US 7,115,320 B2
(45) Date of Patent: Oct. 3, 2006

(54) POLYESTER FILM AND GAS-BARRIER POLYESTER FILM

(75) Inventors: Hiroyuki Tanaka, Otsu (JP); Ryosuke Matsui, Otsu (JP); Koukichi Hashimoto, Otsu (JP)

(73) Assignee: Toray Industries, Inc., (JP)

(*) Notice: Subject to any disclaimer, the term of this patent is extended or adjusted under 35 U.S.C. 154(b) by 42 days.

(21) Appl. No.: 10/506,705

(22) PCT Filed: Jan. 14, 2003

(86) PCT No.: PCT/JP03/00197

§ 371 (c)(1),
(2), (4) Date: Sep. 7, 2004

(87) PCT Pub. No.: WO03/074611

PCT Pub. Date: Sep. 12, 2003

(65) Prior Publication Data

US 2005/0100723 A1    May 12, 2005

(30) Foreign Application Priority Data

| Mar. 7, 2002 | (JP) | 2002-061936 |
| Jun. 13, 2002 | (JP) | 2002-172720 |

(51) Int. Cl.
| B32B 15/09 | (2006.01) |
| B32B 15/29 | (2006.01) |
| B32B 18/00 | (2006.01) |
| C08G 63/183 | (2006.01) |
| C08G 63/672 | (2006.01) |

(52) U.S. Cl. ............ 428/458; 428/337; 428/339; 428/447; 428/457; 428/480; 525/437; 525/444; 525/448; 528/272; 528/300; 528/302; 528/305; 528/308; 528/308.6; 528/308.8

(58) Field of Classification Search .......... None
See application file for complete search history.

(56) References Cited

U.S. PATENT DOCUMENTS

| 4,031,165 A * | 6/1977 | Saiki et al. .......... 525/444 |
| 4,070,417 A * | 1/1978 | Isaka et al. .......... 525/444 |
| 4,081,494 A | 3/1978 | Sakai et al. |
| 4,914,178 A * | 4/1990 | Kim et al. .......... 528/272 |
| 5,804,696 A * | 9/1998 | Seberger et al. .......... 73/1.59 |
| 5,958,567 A | 9/1999 | Wakabayashi et al. |
| 6,630,230 B1 * | 10/2003 | Homma et al. .......... 428/220 |
| 6,670,429 B1 * | 12/2003 | Appelman et al. ....... 525/444.5 |

FOREIGN PATENT DOCUMENTS

| EP | 0 550 039 A2 | 7/1993 |
| EP | 0 576 682 A1 | 1/1994 |
| EP | 0 685 509 A1 | 12/1995 |
| EP | 1 288 261 A1 | 3/2003 |
| JP | 6-107931 | 4/1994 |
| JP | 7-145252 A | 6/1995 |
| JP | 7-330926 | 12/1995 |
| JP | 08 231836 A | 9/1996 |
| JP | 11-92638 A | 4/1999 |
| JP | 2000 319417 A | 11/2000 |
| JP | 2003-319417 | * 11/2000 |
| JP | 2001-11213 | 1/2001 |
| JP | 2001 158071 A | 6/2001 |
| JP | 2001 233950 A | 8/2001 |
| JP | 2002 37993 A | 2/2002 |

OTHER PUBLICATIONS

Christian Fischer et al., "Ordering Processes in Polyester Thermoplastic Elastomers", Polymers for Advanced Technologies, May 1994, GB, vol. 5, pp. 292-295.

* cited by examiner

Primary Examiner—Vivian Chen
(74) Attorney, Agent, or Firm—DLA Piper Rudnick Gray Cary US LLP

(57) ABSTRACT

In order to provide a polyester film having superior impact resistance and flex pinhole resistance, and further exhibiting superior gas barrier properties after a metal or metal oxide is deposited on the film, with the inherent characteristics of polyester film maintained, such as low hygroscopicity, dimensional stability, flatness, and transparency, the polyester film comprises a mixture of 70% to 97% by weight of polyester A mainly composed of a repeating unit comprising ethylene terephthalate and 3% to 30% by weight of polyester B mainly composed of a repeating unit comprising butylene terephthalate. The polyester film has a melting point in range of 245 to 270° C. The polyester film may comprise a polyester resin containing 90% to 60% by weight of an ethylene terephthalate component, 10% to 40% by weight of a butylene terephthalate component, and 0.1% to 5% by weight of a polyoxyalkylene glycol component. The polyester film is suitably used for packaging and other applications.

20 Claims, No Drawings

POLYESTER FILM AND GAS-BARRIER POLYESTER FILM

TECHNICAL FIELD

The present invention relates to polyester films. More specifically, the present invention relates to a packaging polyester film having superior mechanical characteristics, pinhole resistance, dimensional stability, impact resistance, and flexibility, and which is also given a superior gas barrier property by vapor-depositing a metal or metal oxide thereon.

BACKGROUND

Biaxially oriented poly(ethylene terephthalate) film, which is a typical type of polyester film, is broadly used in various fields, such as industrial material, magnetic recording material, optical material, information material, and packaging material, because of its superior mechanical strength, thermal properties, humidity properties, and other outstanding characteristics.

For packaging material, which particularly requires impact resistance and pinhole resistance, however, biaxially oriented aliphatic polyamide film is often used. Poly(ethylene terephthalate) film is less used because of its hardness, which is reflected by its toughness. For example, in packaging applications particularly requiring gas barrier properties and moisture resistance, it is necessary to have impact resistance and flex pinhole resistance represented by Gelbo test and, in addition, to exhibit superior characteristics in these resistances at low temperature.

Unfortunately, aliphatic polyamide has high hygroscopicity, and consequently produces intrinsic disadvantages, such as deterioration of moisture dimensional stability and flatness. For example, it is difficult to deposit a metal compound for enhancing the gas barrier properties, or printing quality or adhesion with a laminated layer is negatively affected by moisture absorption.

In contrast, polyester has low hygroscopicity and accordingly it does not exhibit the foregoing disadvantages. However, the impact and pinhole resistances, which are required for packaging material, are undesirably inferior, as described above.

In order to enhance the impact resistance and pinhole resistance of polyester to overcome the above-described disadvantages, some approaches have been proposed. For example, Japanese Unexamined Patent Application Publication No. 6-79776 discloses a flexible polyester film having a specific Young's modulus; Japanese Unexamined Patent Application Publication No. 7-330926, a polyester film prepared by blending a poly(tetramethylene glycol) having a specific molecular weight to a polyester in a specific proportion and adding a specific amount of specific particles. Japanese Unexamined Patent Application Publication No. 2001-11213 also discloses a flexible polyester film prepared by adding poly(ethylene terephthalate) to a modified poly(butylene terephthalate) containing a specific amount of poly(tetramethylene glycol). However, these approaches undesirably affect the mechanical characteristics and transparency of the resulting films, or the films onto which aluminium oxide or silicon oxide is deposited exhibit poor transparency. Furthermore, important characteristics, impact resistance and flex pinhole resistance, are insufficient.

Accordingly, it would be advantageous to provide a polyester film having the same characteristics as biaxially oriented polyamide film, such as impact resistance and flex pinhole resistance, and further exhibiting superior gas barrier properties after a metal or metal oxide is deposited on the film, with its inherent characteristics maintained, such as low hygroscopicity, dimensional stability, flatness, and transparency.

SUMMARY OF THE INVENTION

This invention relates to a polyester film comprising a polyester resin containing an ethylene terephthalate component, a butylene terephthalate component, and a polyoxyalkylene glycol component, wherein the polyester resin comprises a polyester mainly composed of a repeating unit comprising ethylene terephthalate, a polyester mainly composed of a repeating unit comprising butylene terephthalate, and a block copolymer constituted of poly(ethylene terephthalate) or poly (butylene terephthalate) and a polyester of the polyoxyalkylene glycol and a dicarboxylic acid component, and wherein the content of the ethylene terephthalate component is in the range of 60% to 90% by weight relative to the total amount of the ethylene terephthalate component, the butylene terephthalate component, and the polyoxyalkylene glycol component, the content of the butylene terephthalate component is in the range of 10% to 40% by weight relative to the total amount of the ethylene terephthalate component, the butylene terephthalate component, and the polyoxyalkylene glycol component, and the content of the polyoxyalkylene glycol component is in the range of 0.1% to 5% by weight relative to of the total amount of the ethylene terephthalate component, the butylene terephthalate component, and the polyoxyalkylene glycol component.

DETAILED DESCRIPTION

To overcome the problems, the polyester film of the present invention has features as follows. The polyester film comprises a mixture of 70% to 97% by weight of polyester A and 3% to 30% by weight of polyester B, and has a melting point in the range of 245 to 270° C. Polyester A is mainly composed of a repeating unit comprising ethylene terephthalate, and polyester B is mainly composed of a repeating unit comprising butylene terephthalate. Alternatively, the polyester film comprises a polyester resin containing an ethylene terephthalate component, a butylene terephthalate component, and a polyoxyalkylene glycol component. The content of the ethylene terephthalate is in the range of 60% to 90% by weight relative to the total amount of the ethylene terephthalate component, the butylene terephthalate component, and the polyoxyalkylene glycol component. The content of the butylene terephthalate component is in the range of 10% to 40% by weight relative to the total amount of the ethylene terephthalate component, the butylene terephthalate component, and the polyoxyalkylene glycol component. The content of the polyoxyalkylene glycol component is in the range of 0.1% to 5% by weight relative to of the total amount of the ethylene terephthalate component, the butylene terephthalate component, and the polyoxyalkylene glycol component.

BEST MODE FOR CARRYING OUT THE INVENTION

The polyester film according to the first embodiment of the present invention is prepared by blending 70% to 97% by weight of polyester A mainly composed of a repeating unit comprising ethylene terephthalate and 3% to 30% by weight of polyester B mainly composed of a repeating unit comprising butylene terephthalate. The polyester may contain copolymerization components, such as diol components and dicarboxylic acids in such an amount as not to interfere with the achievement of the object of the present invention. The diol components include straight-chain alkylene glycols, such as trimethylene glycol and hexamethylene glycol, and ether bond-containing diols, such as diethylene glycol, poly (ethylene glycol), and poly(hexamethylene glycol). The dicarboxylic acids include aromatic dicarboxylic acids, such as isophthalic acid and naphthalenedicarboxylic acid, and long-chain dicarboxylic acids, such as sebacic acid and dimer acid. It is, however, preferable that the content of copolymerization components other than ethylene glycol, hexamethylene glycol, and terephthalic acid, is 15 mol % or less, and more preferably 5 mol % or less. Such a preferred range of the content of the copolymerization components prevents the melting point to decrease to less than 245° C., and results in a highly heat-resistant film. In this instance, the content of polyester A mainly composed of a repeating unit comprising ethylene terephthalate is preferably in the range of 70% to 97% by weight, more preferably 75% to 90% by weight, and the content of polyester B mainly composed of a repeating unit comprising butylene terephthalate is preferably in the range of 3% to 30% by weight, more preferably 5% to 10% by weight. If the polyester A content is more than 97% by weight or if the polyester B content is less than 3% by weight, not only is the pinhole resistance not enhanced, but also gas barrier properties are not sufficiently ensured even after vapor deposition. If the polyester A content is less than 70% by weight or if the polyester B content is more than 30% by weight, the resulting film has an inferior heat resistance, elastic modulus, and strength. The polyester film of the present embodiment has a melting point of 245 to 270° C., and preferably 249 to 257° C. A melting point of lower than 245° C. makes it difficult to ensure good gas barrier properties. Even if the gas barrier properties of the resulting film are sufficient, the creep property under a tension or the lengthwise elastic modulus is negatively affected. Consequently, tension in process steps after vapor deposition easily causes the deposited layer to crack and, thus, degrades the gas barrier properties. In general, it is difficult to increase the melting point of polyester having the composition of the present invention to 270° C. or more.

Preferably, the intrinsic viscosity of polyester A used in the polyester film, mainly composed of a repeating unit comprising ethylene terephthalate, is in the range of 0.55 to 0.75, and more preferably 0.58 to 0.66, from the viewpoint of mechanical strength, dimensional stability, and flex pinhole resistance. A type of polyester A having an intrinsic viscosity of less than 0.55 results in a film having not only a low mechanical strength, but also an inferior impact resistance. In addition, ripping may undesirably occur during biaxial orientation.

Preferably, the intrinsic viscosity of polyester B used in the polyester film, mainly composed of a repeating unit comprising butylene terephthalate, is in the range of 0.80 to 1.35, and more preferably 0.95 to 1.25. If the intrinsic viscosity of polyester B is less than 0.90, the viscosity of melted polyester B becomes excessively lower than the viscosity of melted polyester A. Accordingly, it is difficult to prepare a uniformly blended film. In addition, the resulting biaxially oriented film does not have good tear propagation resistance and is liable to exhibit poor flex pinhole resistance. In contrast, if the intrinsic viscosity of polyester B is more than 1.35, the viscosity of melted polyester B becomes excessively higher than the viscosity of melted polyester A. Accordingly, it is difficult to prepare a uniformly blended film, and the resulting film is liable to exhibit poor flex pinhole resistance.

The polyester film of a second embodiment comprises a polyester resin containing an ethylene terephthalate component, a butylene terephthalate component, and a polyoxyalkylene glycol component. The content of the ethylene terephthalate component is 60% to 90% by weight to the total amount of the ethylene terephthalate component, the butylene terephthalate component, and the polyoxyalkylene glycol component. The content of the butylene terephthalate component is 10% to 40% by weight to the total amount of the ethylene terephthalate component, the butylene terephthalate component, and the polyoxyalkylene glycol component. The content of the polyoxyalkylene glycol component is 0.1% to 5% by weight to the total amount of the ethylene terephthalate component, the butylene terephthalate component, and the polyoxyalkylene glycol component. In this instance, it is necessary that the components other than the polyoxyalkylene glycol component in the polyester resin comprise 90% to 60% by weight of the ethylene terephthalate component and 10% to 40% by weight of the butylene terephthalate component. Contents outside these ranges of the ethylene terephthalate component and the butylene terephthalate component negatively affect productivity, flexibility, heat resistance, dimensional stability, and gas barrier properties after vapor deposition.

The content of the butylene terephthalate component is preferably 10% to 30% by weight from the viewpoint of the ease of handling and film formation and the gas barrier properties, and more preferably 10% to 25% by weight from the viewpoint of the transparency, gas barrier properties, and dimensional stability. For blending the ethylene terephthalate component and the butylene terephthalate component, ethylene glycol and 1,4-butanediol, acting as glycol components, may be esterified or transesterified with terephthalic acid to polycondense to a copolymerized polyester. Alternatively, poly(ethylene terephthalate) and poly(butylene terephthalate) are individually polymerized and palletized. The pellets are blended at such a ratio as to be a predetermined ratio in the resulting film, and the mixture is dried and then melt-extruded. Preferably, the latter process, in which the polyesters are individually polymerized and then blended, is employed. In this instance, preferably, the intrinsic viscosity of the ethylene terephthalate is in the range of 0.55 to 0.75, particularly preferably 0.58 to 0.66 and the intrinsic viscosity of the butylene terephthalate is in the range of 0.80 to 1.35, particularly preferably 0.95 to 1.25, as in the foregoing case.

In order to deactivate the polymerization catalyst in the polyester resin to suppress transesterification during melt extrusion, a solid or liquid phosphorus compound may be added.

In the polyester resin constituting the polyester film of the present invention, other components may be copolymerized in addition to the ethylene terephthalate component and the butylene terephthalate component. For example, in order to give formability to the resin, a copolymerization component, such as isophthalic acid, dimer acid, or 1,3-dodecadionic acid, is preferably added. The polyester resin may of course be copolymerized with the polyoxyalkylene glycol component before film formation, or separately prepared polyetherester may be blended with the polyester resin.

The polyester resin used in the polyester film of the present invention has to contain 0.1% to 5% by weight of the polyoxyalkylene glycol component. If the polyoxyalkylene glycol component is not contained, impact resistance and pinhole resistance, which are particularly important factors in packaging application, are not enhanced. However, a polyoxyalkylene glycol content of more than 5% by weight negatively affects the transparency or haze of the film. Preferably, the polyoxyalkylene glycol content is in the range of 0.1% to 3% by weight, and more preferably 0.1% to 1% by weight, from the viewpoint of transparency or haze of the film.

Such polyoxyalkylene glycols include poly(ethylene glycol), poly(trimethylene glycol), poly(tetramethylene glycol), poly(pentamethylene glycol), poly(hexamethylene glycol), poly(heptamethylene glycol), poly(octamethylene glycol), poly(decamethylene glycol), poly(1-methyldimethylene glycol), and poly(2-methyltrimethylene glycol). Among these, preferred are poly(ethylene glycol), poly(trimethylene glycol), and poly(tetramethylene glycol). From the viewpoint of pinhole resistance, poly(tetramethylene glycol) is particularly preferable. Preferably, the molecular weight of the polyoxyalkylene glycol is in the range of 500 to 4,000 from the viewpoint of the dispersibility of the polyoxyalkylene glycol in the polyester and the reduction of the haze of the film. Taking polymerization with the polyester into account, the molecular weight is preferably in the range of 600 to 2,500, and particularly preferably 800 to 1,500.

It is preferable that the polyoxyalkylene glycol in the polyester be in a form of polyether-ester block copolymer constituted of poly(ethylene terephthalate) or poly(butylene terephthalate) and a polyester of the polyoxyalkylene glycol and a dicarboxylic acid component, such as terephthalic acid, from the viewpoint of the increase in pinhole resistance and impact resistance. In particular, the glass transition temperature of the polyether-ester is preferably in the range of $-120$ to $0°$ C., and more preferably $-120$ to $-30°$ C. because such a polyether-ester enhances the effect of increasing the pinhole resistance.

Each of the contents of the ethylene terephthalate component, butylene terephthalate component, and polyoxyalkylene glycol component can be calculated from the amount of the corresponding resin compounded. Alternatively, it can be obtained from a weight ratio calculated from the product of the molecular weight and the molar ratio obtained by solution proton nuclear magnetic resonance ($^1$H-NMR). It has been confirmed that the contents of the components obtained by a measurement substantially agree with the contents calculated from the amounts of the compounded materials, the measurement in which, for example, 25 mg of a resulting film dissolved in a heavy hydrogen-containing hexafluoroisopropanol/hexafluoroisopropanol (1:1) mixed solvent is subjected to NMR measurement at an integration number of 32, a repetition time of 8 s, and a temperature of $35°$ C., with a Bruker NMR apparatus DRX 500.

It is preferable that no melting point be observed in the range of 150 to $235°$ C. when the polyester film is melted, rapidly cooled, and then reheated. Whether the presence or absence of a melting point is determined by the following process. The film is melted at $300°$ C. for 5 minutes and rapidly cooled. The sample is heated at a rate of $20°$ C./min with a differential scanning calorimeter (DSC). If an endothermic peak of 2 J/g or more resulting from the melting of polymer does not appear in the range of 150 to $235°$ C., it is determined that no melting point is observed in this range. If a melting point is observed in the range of 150 to $235°$ C. when the sample is reheated after melting and rapid cooling, the film is liable to exhibit a poor heat resistance and elastic modulus. In addition, when a metal of metal oxide is deposited onto the film, a defect is liable to occur in the deposited layer due to the phase separation of the two polyesters. Thus, it becomes difficult to provide good gas barrier properties. In order to prepare a polyester film having no melting point in the range of 150 to $235°$ C. when it is reheated after melting and rapid cooling, it is effective to appropriately select the type, quantity, molecular weight, and content of copolymerization components of the polyester. It is, in particular, effective to reduce the difference in melting point between polyester A mainly composed of a repeating unit comprising ethylene terephthalate and polyester B mainly composed of a repeating unit comprising butylene terephthalate, or to reduce the content of polyester B if the difference in melting point is large. If polyoxyalkylene glycol component is added, it is also effective to reduce the molecular weight and content of the polyoxyalkylene glycol component.

For polymerization of the polyester, a conventionally known polymerization catalyst and color protection agent may be used. Exemplary polymerization catalysts include, but not limited to, alkali metal compounds, alkaline-earth metal compounds, zinc compounds, lead compounds, manganese compounds, cobalt compounds, aluminium compounds, antimony compounds, titanium compounds, and germanium compounds. Exemplary color protection agents include, but not limited to, phosphorus compounds. Preferably, an alkali metal compound and/or an alkaline-earth metal compound is used as the polymerization catalyst from the viewpoint of ease of content extraction.

As for the addition of the polymerization catalyst, it is preferable to add an antimony compound, a germanium compound, ands/or a titanium compound as the polymerization catalyst in any desired step before completion of polyester production. For such a process, in the case of adding, for example, a germanium compound, powder of the germanium compound may be added as it is, or a germanium compound dissolved in a glycol component being a starting material of polyester may be added as described in Japanese Examined Patent Application Publication No. 54-22234.

Exemplary germanium compounds include germanium dioxide; germanium hydroxide hydrate; germanium alkoxides, such as germanium tetramethoxide and germanium ethylene glycoxide; germanium phenoxides; phosphate-containing germanium compounds, such as germanium phosphate and germanium hypophosphite; and germanium acetate. Among these, preferred is germanium dioxide, particularly amorphous germanium dioxide.

Exemplary antimony compounds include, but not particularly limited to, antimony oxides, such as antimony trioxide, and antimony acetate.

The titanium compounds include, but not limited to, monobutyl titanate, dibutyl titanate, and titanium tetraalkoxides, such as titanium tetraethoxide and titanium tetrabutoxide.

For example, when germanium dioxide is added as the polymerization catalyst for preparation of poly(ethylene terephthalate), a process is preferably applied for preparing a polymer containing elemental germanium, the process in which a terephthalic acid component and an ethylene glycol component are transesterified or esterified, subsequently germanium dioxide and a phosphorus compound are added, and then, the mixture is polycondensed at high temperature and under reduced pressure until the diethylene glycol content reaches a predetermined level.

Preferably, the film of the present invention contains 0.01% to 0.5% by weight of known internal particles or inorganic particles and/or organic particles having a mean grain size in the range of 0.01 to 2 μm, from the viewpoint of enhancing ease of handling and workability. For precipitating the internal particles, a known technique may be used, such as disclosed in Japanese Unexamined Patent Application Publication No. 48-61556, 51-12860, 53-41355, and 54-90397. Other particles may be combined, such as disclosed in Japanese Examined Patent Application NO. 55-20496 and Japanese Unexamined Patent Application Publication No. 59-204617. It should be noted that use of particles having a mean grain size of more than 2 μm may cause a defect in the vapor-deposited layer on the resulting film.

The inorganic particles include wet or dry silica, colloidal silica, aluminium silicate, titanium oxide, calcium carbonate, calcium phosphate, barium sulfate, aluminium oxide, mica, kaoline, and clay. The organic particles may comprise styrene, silicone, acrylic acid compounds, methacrylic acid compounds, polyesters, or divinyl compounds. Among these, preferred are inorganic particles, such as wet or dry silica and alumina, and organic particles comprising styrene, silicone, acrylic acid compounds, methacrylic acid compounds, polyesters, or divinylbenzene. At least two types of the internal particles, inorganic particles, and organic particles may be used in combination. In particular, inorganic particles are preferable, and dry or wet silica is most preferable. Preferably, the particle content is in the range of 0.01% to 0.1% by weight from the viewpoint of gas barrier properties. More preferably, it is in the range of 0.01% to 0.05% by weight. A particle content of more than 0.5% by weight may cause a pinhole in the vapor-deposited layer, if the layer is provided, to degrade the gas barrier properties.

Preferably, the tear propagation resistance in the longitudinal direction of the polyester film of the present invention is at least 8 kN/m, and particularly preferably at least 10 kN/m. A film having a lengthwise tear propagation resistance of less than 8 kN/m is liable to exhibit inferior flex pinhole resistance. The upper limit of the lengthwise tear propagation resistance of the polyester film is not particularly provided. However, it is generally difficult to give a lengthwise tear propagation resistance of more than 20 kN/m to the polyester film of the present invention.

Preferably, the elastic modulus in the longitudinal direction of the polyester film of the present invention is in the range of 3 to 7 GPa, and more preferably 3.5 to 6.5 GPa. A polyester film of the present invention having a lengthwise elastic modulus in the preferred range is not easily deformed by tension during process steps for film treatment after vapor deposition. In treatment to the film particularly, even if the film is subjected to a high tension in the longitudinal direction in, for example, a bag-making apparatus and the substrate film is deformed, the deposited layer can flexibly follow the deformed shape to prevent the occurrence of cracks. Thus, the gas barrier properties do not decrease. Furthermore, the elastic modulus in the width direction and other properties are also superior, and accordingly, the anisotropy can be kept low.

Preferably, the plane orientation coefficient of the polyester film of the present invention is in the range of 0.10 to 0.16, and more preferably 0.15 to 0.16. A plane orientation coefficient in such a preferred range suppresses the decrease in elastic modulus and increases the gas barrier properties. The plane orientation coefficient of the polyester film can be set in a desired range by appropriately selecting the preheating temperature, drawing temperature, draw ratio, and relaxation ratio in the longitudinal direction and width direction, and the temperature of heat treatment after drawing. A plane orientation coefficient of larger than 0.16 often leads to an insufficient flex pinhole resistance. A plane orientation coefficient of less than 0.10 is liable to reduce the elastic modulus of the resulting film, particularly in the longitudinal direction. Accordingly, plastic deformation easily occurs undesirably due to tension during film treatment steps or in use.

Preferably, the Vickers hardness of the polyester film measured at a depth of 0.2 μm with a thin-film hardness tester is in the range of 100 to 500 MPa, more preferably 100 to 450 MPa. The Vickers hardness is measured with a diamond pyramid intender having an angle of 80° between opposite faces. Thus, the hardness in a minute area of the film surface can be known. By selecting the composition of the polyester constituting the polyester film serving as the substrate of a gas barrier film according to the foregoing description and setting the Vickers hardness to be 500 MPa or less, undulation or projections observed in a small area at the surface of the substrate are reduced due to heat treatment after biaxial orientation and thermal history in vapor deposition. Consequently, defects in the deposited layer are prevented to increase the adhesion between the substrate and the deposited layer, and thus the gas barrier properties are advantageously increased. In general, it is difficult to set at 100 MPa or less the Vickers hardness of a polyester film comprising polyester having such a specific composition as the substrate of the gas barrier film of the present invention has. In order to reduce the Vickers hardness, the component ratio in the polyester film of polyester B mainly composed of a repeating unit comprising butylene terephthalate may be increased; the plane orientation coefficient of the polyester film may be reduced by increasing drawing temperature or reducing draw ratio; or heat treatment temperature after drawing may be lowered to reduce the crystallinity of the polyester film. Any of the methods is liable to reduce the plane orientation coefficient and the lengthwise elastic modulus of the polyester film. A low lengthwise elastic modulus easily causes defects in the deposited layer or other problems. It is necessary to appropriately select material composition and conditions of film formation so as to set the Vickers hardness, the lengthwise elastic modulus, and the plane orientation coefficient of the film in the preferred ranges.

Preferably, the haze of the polyester film of the present invention is in the range of 0.1% to 5%. In order to give a superior slip property to the polyester film, a lubricant or other additives must be added. Accordingly, it is difficult to reduce the haze to 0.1% or less. If the haze of the substrate film is in the preferred range, nonuniformity of the inside and surface of the film is low. Accordingly, defects in the deposited layer are not easily caused by the nonuniformity, and the gas barrier properties are not degraded.

Preferably, the thickness of the polyester film of the present invention is in the range of 5 to 50 μm, and more preferably 10 to 25 μm. A film having a thickness in the preferred range is easy to handle when it is used for packaging bags, and exhibits, as a substrate, such a superior stiffness as to prevent tension applied in process steps after vapor deposition from causing defects in the deposited layer. Even if the film is bent in the process steps after vapor deposition with the deposited layer facing outward, deformation of the deposited side does not easily occur, and thus defects in the deposited layer are prevented.

Preferably, the density of the polyester film of the present invention is in the range of 1.36 to 1.41 g/cm$^3$. A density in the preferred range prevents the resulting film from having a low elastic modulus, becoming brittle, exhibiting an excessively high Vickers hardness, thus leading to a film having superior gas barrier properties.

Preferably, the limit viscosity (measured in o-chloroform at 25° C.) of the polyester constituting the polyester film of the present invention is in the range of 0.4 to 1.2 dL/g, and more preferably 0.5 to 0.8 dL/g, from the viewpoint of melt extrusion properties and setting the elastic modulus of the resulting film in the preferred range.

Preferably, the polyester film of the present invention is biaxially oriented. The biaxially oriented polyester film is prepared by drawing an undrawn film in the width direction and the longitudinal direction, as described later, by sequential biaxial orientation or simultaneous biaxial orientation.

The process for preparing the polyester film of the present invention is not particularly limited. For example, an undrawn film may be prepared by a process in which a polyester optionally dried at high temperature under reduced pressure is melted in a known melt extruder and extruded from a slit-shaped die to form a sheet and static electricity is applied to the sheet from wire electrodes or tape electrodes, or in which the extruded polymer sheet is cooled to solidify by a casting method providing a water film between the casting drum and the polymer sheet. The undrawn film is drawn by sequential biaxial orientation or simultaneous biaxial orientation. In the sequential biaxial orientation, the film is drawn in the longitudinal direction using a difference in peripheral speed between heating rolls, and then drawn in the width direction with the film held by a clip. In the simultaneous biaxial orientation, the film held by a clip is substantially simultaneously drawn in the longitudinal direction and the width direction. Preferably, the draw ratio in the drawing process is in the range of 2.0 to 5.5 times for each direction, and more preferably 2.5 to 4.0 times. Preferably, the drawing speed is in the range of 1,000 to 200,000%/min, and the drawing temperature is between the glass transition temperature of the polyester and a temperature 40° C. higher than the glass transition temperature. Drawing may be performed several times for each direction.

The film is further heat-treated after biaxial orientation. This heat treatment is performed in an oven at a temperature in the range of 140 to 230° C. for 1 to 30 seconds while the film is in constant length or shrunk gradually. In order to set the elastic modulus, the plane orientation coefficient, and Vickers hardness in the preferred ranges, it is necessary to appropriately select the polyester composition, the preheating temperature, drawing temperature, draw ratio, and relaxation ratio in the longitudinal and width directions, and the temperature of heat treatment after drawing.

The gas barrier polyester film of the present invention comprises the polyester film prepared as above and a film formed by depositing any one of metallic aluminium, silicon oxide, and aluminium oxide onto at least one surface of the polyester film. These metal compounds to be deposited onto the polyester film may be used singly or in a mixture form. The deposited thin film may be formed by vacuum vapor deposition, EB deposition, sputtering, ion plating, and other methods. Most Preferably, vacuum vapor deposition is employed from the viewpoint of productivity and cost. In order to enhance the adhesion between the polyester film and the deposited layer, it is preferable that the surface of the polyester film be pretreated by corona discharge treatment or application of an anchor coating agent. For use as packaging bags of the polyester film of the present invention, a non-drawn film called sealant, such as polyethylene, ethylene-vinyl acetate copolymer, or ionomer, is laminated onto the polyester film to form a composite so as to give a heat seal property. Another drawn film, such as of nylon, polyester, or polypropylene, may be laminated to the composite film, according to the required characteristics. For lamination, dry lamination, extruding lamination, and other lamination techniques may be applied.

The polyester film of the present invention has the same characteristics as biaxially oriented polyamide film, such as impact resistance and flex pinhole resistance, and further exhibits superior gas barrier properties after a metal or metal oxide is deposited, with the inherent characteristics of polyester film maintained, such as low hygroscopicity, dimensional stability, flatness, and transparency. Accordingly, the polyester film can be suitably used in food packaging and other applications.

(Measurement of Characteristics and Evaluation of Effects)

The processes for measuring the characteristics and evaluating effects are as follows:

(1) Melting Point, Glass Transition Temperature, and Whether Presence or Absence of Melting Point in the Range of 150 to 235° C.

The measurements were performed with a DSC (differential scanning calorimeter) RDC 220 produced by Seiko Instruments Inc. A 5-mg sample is set to the DSC, and the glass transition temperature was measured while temperature is increased from 25° C. to 300° C. at a rate of 10° C./min. The melting point was determined from the temperature of endothermic peak resulting from crystal fusion. Whether the presence or absence of a melting point in the range of 150 to 235° C. was determined by heating a sample which had been melted at 300° C. for 5 minutes and subsequently cooled rapidly, at a rate of 20° C./min with the differential scanning calorimeter (DSC). If there is an endothermic peak of 2 J/g or more resulting from fusion of the polymer in the range of 150 to 235° C., it is determined that the melting point is present in this range. If there is not an endothermic peak of 2 J/g or more, it is determined that no melting point is present in this range.

(2) Intrinsic Viscosity

A value is used which is calculated from the viscosity of a solution in ortho-trichlorophenol measured at 25° C., according to the following equation:

$$\eta_{sp}/C = [\eta] + K[\eta]^2 \cdot C$$

where $\eta_{sp}$ = (solution viscosity/solvent viscosity) − 1

C represents the weight of polymer dissolved in 100 mL of solvent (g/100 mL, normally 1.2)

K represents the Huggins constant (set at 0.343)

The solution viscosity and the solvent viscosity were measured with an Ostwald viscometer.

(3) Haze

The haze was measured with a turbidimeter SEP-H-2 series (produced by Nippon Seimitsu Kogaku) in accordance with JIS K 6714-58.

(4) Flex Pinhole Resistance

A film cut into dimensions of 297 mm by 210 mm was subjected to 500-times flex test with a Gelbo tester in an atmosphere of 0° C. carbon dioxide in accordance with ASTM F-392. The test was performed five times and an average number of pinholes was calculated.

(5). Impact Resistance

Bags of 200 mm by 150 mm containing 250 mL of salt water were prepared by sealing the four sides of a film laminated with non-drawn polypropylene sheet having a thickness of 60 μm. Ten of the bags were cooled to 0° C. and dropped from a height of 1.25 m. The number of broken bags or leaky bags was counted.

(6) Vickers Hardness

Vickers hardness was measured with a thin film hardness tester MHA-400 produced by NEC Corporation. Load W(x) was measured when an indentation having a depth x was formed by pressing a diamond pyramid indenter with an angle of 80° between opposite faces into the film at a speed of 10.5nm/min. Vickers hardness H($\epsilon$) at a depth $\epsilon$ is obtained from the following equation, and thus the Vickers hardness at a depth of 0.2 μm was determined.

$$W(x) = \int_0^x (x-\varepsilon)H(\varepsilon)d\varepsilon$$

(7) Plane Orientation Coefficient

The refractive index in each direction of the film was measured with an Abbe refractometer having a polarizer, 4T produced by Atago, and the plane orientation coefficient was obtained according to the following equation. The light source was a halogen lamp; the immersion liquid contains methylene iodide; the refractive index of the upper prism was 1.740.

Plane orientation coefficient=$\{(n_x+n_y)/2\}-n_z$, where, $n_x$: refractive index in the longitudinal direction of the film, $n_y$: refractive index in the width direction of the film; $n_z$: refractive index in the thickness direction.

(8) Elastic Modulus

The sample was cut in the longitudinal direction into a rectangular shape of 200 mm in length by 10 mm in width. The sample was subjected to measurement at 25° C., 65% RH with a tension tester produced by Toyo Seiki Seisaku-sho in accordance with JIS K 7127. The initial chuck distance was set at 100 mm, and the tensile speed, at 300 mm/min. The measurement was performed 20 times on different samples and the results were averaged.

(9) Oxygen Permeability (mL/m²·Day)

Oxygen permeability was measured under conditions of 20° C. in temperature, 0% RH in humidity with OX-TRAN 2/20 produced by Modern Controls in accordance with JIS K 7129.

(10) Water Vapor Permeability (g/m²·Day)

Water vapor permeability was measured under conditions of 40° C. in temperature and 90% RH in humidity with PERMATRAN-W 3/30 produced by Modern Controls in accordance with JIS K 7129.

(11) Oxygen Permeability (mL/m²·Day) after Repetitive Rubbing

The film was cut into a sample piece of 200 mm in width direction and 300 mm in the longitudinal direction. Aluminium bars of 20 g in weight was attached to the upper and lower side of the film in the width direction, and the film was wound 90° around a SUS fixing roll having a diameter of 20 mm with the surface having no deposited layer in contact with the roll. Oxygen permeability was thus measured under conditions of 20° C. in temperature, 0% RH in humidity with OX-TRAN 2/20 produced by Modern Controls in accordance with JIS K 7129.

(12) Thermal Shrinkage (Heat Resistance)

Thermal shrinkage in the longitudinal direction of the film was measured in accordance with JIS C 2318. The measurement was performed 20 times on different samples at an oven temperature of 150° C. for a holding time of 30 minutes. The lower the thermal shrinkage, the better. Preferably, the thermal shrinkage is 3% or less from the viewpoint of ease of handling in process steps.

(13) Tear Propagation Resistance

Tear propagation resistance was measured with a light-load tear tester produced by Toyo Seiki Seisaku-sho in accordance with ASTM-D-1922. A sample having dimensions of 64 mm by 54 mm was provided with a 13 mm pre-cut slit in the longitudinal direction. The rest of the length, that is 51 mm, was torn, and the indication at this point-was read.

EXAMPLES

The present invention-will now be further described with reference to examples.

(Preparation of Polyester)

The following polyesters and polyether-esters were used in the examples.

(Polyester A-1)

Into a mixture of 100 parts by weight of dimethyl terephthalate and 60 parts by weight of ethylene glycol were added 0.09 part by weight of magnesium acetate and 0.03 part by weight of antimony trioxide. The mixture was heated and transesterified in a common process. The ethylene glycol was prepared by compounding a non-particulate ethylene glycol and an ethylene glycol slurry containing aggregated silica particles having a mean secondary particle size of 1.2 μm so that the resulting poly(ethylene terephthalate) polymer would contain 0.05% by weight of aggregated silica. Then, 0.020 part by weight of 85% phosphoric acid aqueous solution was added into the product of the transesterification, and the mixture was placed in a polycondensation reactor. The pressure of the reaction system was gradually reduced while the temperature was increased, and the reaction system was subjected to polycbndensation at 290° C. under a reduced pressure of 1 mmHg in a common process to yield a poly(ethylene terephthalate) resin having an intrinsic viscosity of 0.64 and a melting point of 255° C.

(Polyester B-1)

A mixture of 100 parts by weight of terephthalic acid and 110 parts by weight of 1,4-butanediol was heated to 140° C. in an atmosphere of nitrogen to prepare a homogeneous solution. After adding 0.054 part by weight of tetra-n-butyl orthotitanate and 0.054 part by weight of monohydroxybutyltin oxide, esterification was performed in a common process. Then, 0.066 part by weight of tetra-n-butyl orthotitanate was added and polycondensation was performed under a reduced pressure of 1 mmHg to yield a poly(butylene terephthalate) resin having an intrinsic viscosity of 0.80. The chips of the resulting polyester were further subjected to solid phase polymerization in a common process to yield a poly(butylene terephthalate) resin having a melting point of 226° C. and an intrinsic viscosity of 1.20.

(Polyesters A-2, B-2)

Poly(ethylene terephthalate) (A-2, intrinsic viscosity: 0.67, melting point: 228° C.) and poly(butylene terephthalate) (B-2, intrinsic viscosity: 1.10, melting point: 208° C.) were prepared in exactly the same manner as polyesters A-1 and B-1, respectively, except that monomers added in polymerization were replaced.

(Polyester A-3)

Into a mixture of 100 parts by weight of dimethyl terephthalate and 60 parts by weight of ethylene glycol were added 0.09 part by weight of magnesium acetate and 0.03 part by weight of antimony trioxide. The mixture was heated and transesterified in a common process. Then, 0.020 part by weight of 85% phosphoric acid aqueous solution was added into the product of the transesterification, and the mixture was placed in a polycondensation reactor. The pressure of the reaction system was gradually reduced while the temperature was increased, and the reaction system was subjected to polycondensation at 290° C. under a reduced pressure of 1 mmHg in a common process to yield a poly(ethylene terephthalate) having an intrinsic viscosity of 0.65.

(Polyesters A-4, A-5)

Poly(ethylene terephthalate) resins shown in Table 1 were prepared using different copolymerization components under different conditions, from those of polyester A-3.

(Polyester A-6)

When polyester A-3 was polymerized, an ethylene glycol slurry of aggregated silica particles having a mean secondary particle size of 1.0 μm was added to yield a poly(ethylene terephthalate) resin containing 2% by weight of aggregate particles.

(Polyester B-3)

A mixture of 100 parts by weight of terephthalic acid and 110 parts by weight of 1,4-butanediol was heated to 140° C. in an atmosphere of nitrogen to prepare a homogeneous solution. After adding 0.054 part by weight of tetra-n-butyl orthotitanate and 0.054 part by weight of monohydroxybutyltin oxide, esterification was performed in a common process. Then, 0.066 part by weight of tetra-n-butyl orthotitanate was added and polycondensation was performed under reduced pressure (<0.5 torr) to yield a poly(butylene terephthalate) resin having an intrinsic viscosity of 0.89.

(Polyester B-4)

Polyester B-3 was subjected to solid phase polymerization in a common process to yield a poly(butylene terephthalate) resin having an intrinsic viscosity of 1.25.

(PEE-A)

Into a mixture of 100 parts by weight of dimethyl terephthalate, 83 parts by weight of ethylene glycol, and 19.1 parts by weight of poly(ethylene glycol) having a molecular weight of 1,000 were added 0.09 part by weight of magnesium acetate and 0.03 part by weight of antimony trioxide. The mixture was heated and transesterified in a common process. Then, 0.020 part by weight of 85% phosphoric acid aqueous solution was added into the product of the transesterification, and the mixture was placed in a polycondensation reactor. The pressure of the reaction system was gradually reduced while the temperature was increased, and the reaction system was subjected to polycondensation at 290° C. under a reduced pressure of 1 mmHg in a common process to yield a polyether-ester resin.

(PEE-B)

Relative to 100 parts by weight of terephthalic acid, 0.047 part by weight of titanium tetrabutoxide was added into a mixture of 100 parts by weight of terephthalic acid, 94 parts by weight of 1,4-butanediol, and 42.6 parts by weight of poly(tetramethylene glycol) having a number average molecular weight of 1,000. The mixture was esterified at a temperature in the range of 190 to 225° C. After adding 0.2 part by weight of an antioxidant, the mixture was subjected to polycondensation under reduced pressure in a common process to yield a polyether-ester.

(PEE-C, PEE-D)

Polyether-ester resins shown in Table 1 were prepared using different monomers from those of PEE-B.

(PTMG)

A poly(tetramethylene glycol) having a molecular weight of 2,500 was used.

Table 1 shows the resins prepared in the above-described processes.

TABLE 1

| Resin | Acid component | | Glycol component | | Polyoxyalkylene glycol | | | Intrinsic viscosity | Melting point (° C.) | Glass transition temperature (° C.) |
|---|---|---|---|---|---|---|---|---|---|---|
| | Type | mol % | Type | mol % | Type | Molecular weight | Wt % | | | |
| Polyester A-1 | DMT | 100 | EG | 100 | | | | 0.64 | 255 | 77 |
| Polyester A-2 | DMT | 90 | EG | 100 | | | | 0.67 | 228 | 73 |
| | DMI | 10 | | | | | | | | |
| Polyester A-3 | DMT | 100 | EG | 100 | | | | 0.65 | 255 | 77 |
| Polyester A-4 | DMT | 100 | EG | 100 | | | | 0.74 | 254 | 77 |
| Polyester A-5 | DMT | 90 | EG | 100 | | | | 0.68 | 232 | 74 |
| | DMI | 10 | | | | | | | | |
| Polyester A-6 | DMT | 100 | EG | 100 | | | | 0.65 | 255 | 77 |
| Polyester B-1 | TPA | 100 | BD | 100 | | | | 1.20 | 226 | |
| Polyester B-2 | TPA | 90 | BD | 100 | | | | 1.10 | 208 | |
| | IPA | 10 | | | | | | | | |
| Polyester B-3 | TPA | 100 | BD | 100 | | | | 0.89 | 226 | |
| Polyester B-4 | TPA | 100 | BD | 100 | | | | 1.25 | 226 | |
| PEE-A | DMT | 100 | EG | 100 | PEG | 1000 | 10 | | 253 | 57 |
| PEE-B | TPA | 100 | BD | 100 | PTMG | 1000 | 25 | | 216 | 3 |
| PEE-C | TPA | 100 | BD | 100 | PTMG | 1500 | 60 | | 177 | −58 |
| PEE-D | TPA | 100 | BD | 100 | PTMG | 1200 | 45 | | 195 | −35 |
| PTMG | | | | | PTMG | 2500 | 100 | | | |

The values in mol % of acid and glycol components each represent the molar concentration of the copolymerized constituent (polyoxyalkylene glycol is not taken into account).

The value in wt % of polyoxyalkylene glycol represents the content in percent by weight in the resin.

Abbreviation in the table, DMT: dimethyl terephthalate, DMI: dimethyl isophthalate, TPA: terephthalic acid, IPA: isophthalic acid, EG: ethylene glycol, BD: 1,4-butanediol, PEG: poly(ethylene glycol), PTMG: poly(tetramethylene glycol)

Example 1

Blended were 80 parts by weight of polyester A-1 and 20 parts by weight of polyester B-1. After the chips of the blended polyesters were vacuum-dried, the mixture was melt-extruded and discharged from an extrusion head onto a metal roll cooled to 20° C. to yield undrawn film while static electricity was applied. Then, the undrawn film was heated to 95° C. and was drawn in the longitudinal direction between rolls to 3.4 times the length. Then, the film was drawn in the width direction to 3.8 times the width at 110° C. with a tenter drawing machine, and was heat-treated at 200° C. for 10 seconds with 3% relaxed in the width direction. The film was subsequently passed through a cooling zone of 100° C. to yield a polyester film having a thickness of 12 μm. The resulting film was examined for melting point, whether the presence or absence of a melting point in the range of 150 to 235° C., lengthwise and widthwise elastic moduli, tear propagation resistance, Vickers hardness, plane orientation coefficient, haze, thermal shrinkage, flex pinhole resistance, and impact resistance. For gas barrier properties, corona discharge treatment was applied to one surface of the polyester film, and an aluminium layer was vapor-deposited to a thickness of 50 nm on the treated surface. The resulting film was measured for the oxygen permeability, water-vapor permeability, and oxygen permeability after repetitive rubbing. The results are shown in Tables 2 and 3. This polyester film exhibited superior characteristics as shown in Table 3.

Examples 2 to 5, Comparative Examples 1 to 3

Each polyester film was prepared in the same manner as in Example 1 except that the type of polyester, compound ratio, temperature of heat treatment after drawing, thickness, and type of inorganic deposited layer were replaced with those shown in Table 2. The polyester films of Examples 2 to 4 exhibited superior characteristics as shown in Table 3. In contrast, some of the characteristics of the films of Comparative Examples 1 to 3 were inferior because they did not satisfy the requirements of the present invention.

TABLE 2

| | Polyester A (part by weight) | Polyester B (part by weight) | Inorganic deposited layer for gas barrier evaluation | Heat treatment temperature (° C.) | Thickness (μm) | Film melting point (° C.) | Is there melting point in 150 to 235° C.? | Lengthwise/ widthwise elastic modulus (GPa) | Tear propagation resistance (kN/m) | Vickers hardness (MPa) |
|---|---|---|---|---|---|---|---|---|---|---|
| Example 1 | A-1 (80) | B-1 (20) | Aluminium | 200 | 12 | 251 | No | 3.6/4.0 | 16 | 440 |
| Example 2 | A-1 (72) | B-1 (28) | Aluminium | 190 | 12 | 248 | No | 3.2/3.8 | 12 | 400 |
| Example 3 | A-1 (92) | B-1 (8) | Aluminium oxide | 210 | 12 | 253 | No | 4.3/4.5 | 7 | 490 |
| Example 4 | A-1 (85) | B-2 (15) | Silicon oxide | 200 | 15 | 246 | No | 2.8/3.0 | 10 | 390 |
| Example 5 | A-1 (85) | B-3 (15) | Aluminium | 200 | 15 | 245 | No | 2.9/3.0 | 9 | 360 |
| Comparative Example 1 | A-1 (100) | No | Aluminium | 200 | 12 | 255 | No | 4.6/4.8 | 4 | 530 |
| Comparative Example 2 | A-1 (65) | B-1 (35) | Aluminium | 190 | 12 | 245 | Yes | 2.5/3.0 | 6 | 350 |
| Comparative Example 3 | A-2 (80) | B-2 (20) | Aluminium | 190 | 12 | 223 | No | 2.2/2.8 | 9 | 340 |

TABLE 3

| | Plane orientation coefficient | Haze (%) | Heat resistance (thermal shrinkage) (%) | Oxygen permeability (mL/m² · day) | Water vapor permeability (g/m² · day) | Oxygen permeability after rubbing (mL/m² · day) | Flex pinhole resistance (pcs) | Impact resistance (pcs) |
|---|---|---|---|---|---|---|---|---|
| Example 1 | 0.157 | 1.8 | 1.0 | 0.5 | 0.6 | 0.8 | 3.0 | 4 |
| Example 2 | 0.155 | 1.7 | 1.5 | 0.6 | 0.8 | 2.0 | 2.2 | 3 |
| Example 3 | 0.162 | 2.0 | 0.5 | 1.0 | 1.5 | 3.0 | 5.6 | 5 |
| Example 4 | 0.148 | 3.0 | 2.0 | 0.7 | 1.2 | 2.5 | 4.0 | 4 |
| Example 5 | 0.148 | 3.0 | 2.5 | 1.2 | 1.5 | 3.5 | 4.0 | 4 |
| Comparative Example 1 | 0.165 | 2.1 | 0.5 | 2.5 | 3.0 | 5.0 | 52 | 10 |

TABLE 3-continued

|  | Plane orientation coefficient | Haze (%) | Heat resistance (thermal shrinkage) (%) | Oxygen permeability (mL/m² · day) | Water vapor permeability (g/m² · day) | Oxygen permeability after rubbing (mL/m² · day) | Flex pinhole resistance (pcs) | Impact resistance (pcs) |
| --- | --- | --- | --- | --- | --- | --- | --- | --- |
| Comparative Example 2 | 0.156 | 2.5 | 3.0 | 2.5 | 3.2 | 10.0 | 5.0 | 6 |
| Comparative Example 3 | 0.140 | 2.0 | 3.0 | 2.8 | 3.4 | 11.0 | 7.0 | 6 |

In the following Examples 6 to 12 and Comparative Examples 4 to 8, 3 parts by weight of polyester A-6 was used in polyester 1 and the film contained 0.06% by weight of aggregated silica particles, unless otherwise noted. For gas barrier properties, corona discharge treatment was applied to one surface of the polyester film, and an aluminium layer was vapor-deposited to a thickness of 30 nm on the treated surface with a continuous vapor deposition apparatus.

Example 6

Polyester resins were blended at the ratio shown in Table 4 and vacuum-dried. The mixture was fed into a 200-mm single-screw melt extruder and extruded from a T die onto a hard chromium plated drum cooled to 23° C. to yield an undrawn sheet while static electricity was applied. The sheet was pre-heated to 105° C. on the roll, and then drawn in the longitudinal direction to 3.5 times the length. The drawn sheet was cooled on a cooling roll. Subsequently, the sheet was passed through a stenter-type transverse drawing and heat treatment apparatus with the ends of the film held, and drawn in the width direction to 3.5 times the width at a pre-heating temperature of 80° C. and a drawing temperature of 105° C. The sheet was heat-treated at 210° C. for 4 seconds and cooled while being 3.3% relaxed in the width direction, and thus a film having a thickness of 12 μm was wound up. The characteristics and evaluation results of the film are shown in Table 5. The film of Example 6 is superior not only in transparency, but also in flex pinhole resistance, impact resistance, and gas barrier properties. Accordingly, the film is suitable for packaging.

Comparative Example 4

After being vacuum-dried at 180° C., a mixture of 97.5 parts by weight of polyester A-3 and 2.5 parts by weight of polyester A-6 was fed into a 200-mm single-screw melt extruder and extruded from a T die onto a hard chromium plated drum cooled to 20° C. to yield an undrawn sheet while static electricity was applied. The sheet was pre-heated to 110° C. on the roll, and then drawn in the longitudinal direction to 3.5 times the length. The drawn sheet was cooled on a cooling roll. Subsequently, the sheet was passed through a stenter-type transverse drawing and heat treatment apparatus with the ends of the film held, and drawn in the width direction to 3.5 times the width at a pre-heating temperature of 90° C. and a drawing temperature of 110° C. The sheet was heat-treated at 210° C. for 4 seconds and cooled while being 3.3% relaxed in the width direction, and thus a film having a thickness of 12 μm was wound up. The characteristics and evaluation results of the film are shown in Table 5. The film of Comparative Example 4 was inferior in gas barrier properties, impact resistance, and flex pinhole resistance.

Examples 7 to 10, Comparative Examples 6 and 7

Polyester resins and a polyether-ester resin were blended at the compound ratio shown in Table 4 and vacuum-dried. The mixture was fed into a 90-mm single-screw melt extruder and extruded from a T die onto a hard chromium plated drum cooled to 25° C. to yield an undrawn sheet while static electricity was applied. The sheet was pre-heated to 100° C. on the roll, and then drawn in the longitudinal direction to 3.5 times the length. The drawn sheet was cooled on a cooling roll. Subsequently, the sheet was passed through a stenter-type transverse drawing and heat treatment apparatus with the ends of the film held, and drawn in the width direction to 3.5 times the width at a pre-heating temperature of 80° C. and a drawing temperature of 105° C. The sheet was heat-treated at 210° C. for 5 seconds and cooled while being 3.5% relaxed in the width direction, and thus a film having a thickness of 12 μm was wound up. The characteristics and evaluation results of the film are shown in Table 5. The films of Examples 7 to 10 are superior not only in transparency, but also in flex pinhole, resistance, impact resistance, and gas barrier properties. Accordingly, the film is suitable for packaging. On the other hand, in the films of Comparative Examples 6 and 7, at least one of the characteristics was inferior even if some if the transparency, gas barrier properties, and flex pinhole resistance were superior.

Example 11

Polyester resins and a polyether-ester resin, but not containing polyester A-6, were blended at the compound ratio shown in Table 4 and vacuum-dried, and then the mixture was fed into a 90-mm single-screw melt extruder. Separately, polyester resins (2.5 parts by weight of polyester A-6 was contained in polyester A-3) and the polyether-ester resin were blended at the compound ratio shown in Table 4 and vacuum-dried, and then the mixture was fed into a 40-mm uniaxial melt extruder. The two types of mixture from the extruders were formed into an A/B/A type three-layer composite with the layers containing particles outward in a feed block provided at the upper portion of a T die. The composite was cast onto a hard chromium plated drum cooled to 23° C. to yield an undrawn sheet while static electricity was applied. The sheet was pre-heated to 105° C. on the roll, and then drawn in the longitudinal direction to 3.5 times the length. The drawn sheet was cooled on a cooling roll. Subsequently, the sheet was passed through a stenter-type transverse drawing and heat treatment apparatus with the ends of the film held, and drawn in the width direction to 3.5 times the width at a pre-heating temperature of 80° C. and a drawing temperature of 105° C. The sheet was heat-treated at 210° C. for 4 seconds and cooled while being 3.3% relaxed in the width direction, and thus a film having a thickness of 12 μm was wound up. The characteristics and evaluation results of the film are shown in Table 5. The film of Example 11 is superior not only in transparency, but also in flex pinhole resistance, impact resistance, and gas barrier properties. Accordingly, the film is suitable for packaging.

Example 12, Comparative Example 5

Polyester resins and a polyoxyalkylene glycol were blended at the compound ratio shown in Table 4. The mixture was fed into a 44-mm twin-screw vented melt extruder and extruded from a T die onto a hard chromium pre-heating temperature of 80° C. and a drawing temperature of 105° C. The sheet was heat-treated at 210° C. for 5 seconds and cooled while being 3.5% relaxed in the width direction, and thus a film having a thickness of 12 μm was wound up. The characteristics and evaluation results of the film are shown in Table 5. The film of Example 7 is superior not only in transparency, but also in flex pinhole resistance, impact resistance, and gas barrier properties. Accordingly, the film is suitable for packaging. The film of Comparative Example 5 was inferior in gas barrier properties, impact resistance, and flex pinhole resistance.

TABLE 4

| | Polyester A | | Polyester B | | Polyoxyalkylene glycol or polyether ester | | Polyoxyalkylene glycol content in film (wt %) | Butylene terephthalate content in film (wt %) | Film melting point (° C.) | Is there melting point in 150 to 235° C.? |
|---|---|---|---|---|---|---|---|---|---|---|
| | Type | Compound ratio (part by weight) | Type | Compound ratio (part by weight) | Type | Compound ratio (part by weight) | | | | |
| Example 6 | A-3 | 79 | B-4 | 20 | PEE-C | 1 | 0.6 | 20.4 | 252 | No |
| Example 7 | A-3 | 60 | B-4 | 35 | PEE-C | 5 | 3 | 37 | 231/251 | Yes |
| Example 8 | A-3 | 32 | B-4 | 38 | PEE-A | 30 | 3 | 38 | 231/251 | Yes |
| Example 9 | A-5 | 83 | B-3 | 15 | PTMG | 2 | 2 | 15 | 225 | Yes |
| Example 10 | A-4 | 70 | B-4 | 10 | PEE-B | 20 | 5 | 18 | 251 | No |
| Example 11 | A-3 | 85 | B-4 | 10 | PEE-D | 5 | 2.3 | 13 | 251 | No |
| Example 12 | A-4 | 79.5 | B-3 | 20 | PTMG | 0.5 | 0.5 | 20 | 250 | No |
| Comparative Example 4 | A-3 | 100 | | | | | 0 | 0 | 255 | No |
| Comparative Example 5 | A-4 | 90 | B-4 | 6 | PTMG | 4 | 4 | 6 | 251 | No |
| Comparative Example 6 | A-3 | 55 | B-3 | 35 | PEE-B | 10 | 2.5 | 42.5 | 230/251 | Yes |
| Comparative Example 7 | A-4 | 80 | | | PEE-C | 20 | 12 | 8 | 252 | No |

TABLE 5

| | Haze (%) | Flex pinhole resistance (pcs) | Impact resistance (pcs) | Gas barrier properties | | | Lengthwise elastic modulus (GPa) | Vickers hardness (MPa) | Tear propagation resistance (kN/m) | Heat resistance (thermal shrinkage) (%) |
|---|---|---|---|---|---|---|---|---|---|---|
| | | | | Oxygen permeability (mL/m² · day) | Vapor permeability (g/m² · day) | Plane orientation coefficient | | | | |
| Example 6 | 3.0 | 0.4 | 1 | 0.2 | 0.3 | 0.156 | 3.5 | 430 | 15 | 1.0 |
| Example 7 | 5.5 | 3.0 | 3 | 0.2 | 0.2 | 0.151 | 3.1 | 380 | 8 | 2.6 |
| Example 8 | 3.4 | 5.8 | 3 | 0.3 | 0.3 | 0.130 | 2.7 | 300 | 7 | 2.8 |
| Example 9 | 4.2 | 1.0 | 3 | 0.4 | 0.5 | 0.159 | 4.0 | 450 | 9 | 1.5 |
| Example 10 | 11.3 | 0.4 | 2 | 0.3 | 0.3 | 0.152 | 3.3 | 400 | 11 | 2.2 |
| Example 11 | 4.9 | 0.6 | 2 | 0.3 | 0.4 | 0.160 | 2.6 | 480 | 8 | 1.2 |
| Example 12 | 3.2 | 1.2 | 3 | 0.4 | 0.6 | 0.157 | 3.6 | 440 | 16 | 1.5 |
| Comparative Example 4 | 2.9 | 48 | 10 | 2.4 | 1.4 | 0.164 | 4.5 | 540 | 4 | 0.5 |
| Comparative Example 5 | 6.3 | 25 | 10 | 0.7 | 0.7 | 0.158 | 3.9 | 420 | 6 | 1.5 |
| Comparative Example 6 | 30.9 | 0.8 | 2 | 0.3 | 0.3 | 0.120 | 2.4 | 200 | 7 | 2.6 |
| Comparative Example 7 | 4.4 | 6.6 | 9 | 0.9 | 0.9 | 0.131 | 3.0 | 300 | 5 | 2.8 | plated drum cooled to 25° C. to yield an undrawn sheet while static electricity was applied. The sheet was pre-heated to 100° C. on the roll, and then drawn in the longitudinal direction to 3.5 times the length. The drawn sheet was cooled on a cooling roll. Subsequently, the sheet was passed through a stenter-type transverse drawing and heat treatment apparatus with the ends of the film held, and drawn in the width direction to 3.5 times the width at a Examples 13 and 14, Comparative Example 8

Corona discharge treatment was applied to one surface of each film prepared in Examples 6 and 7 and Comparative Example 4, and was an aluminium oxide layer was vapor-deposited to a thickness of 40 nm on the treated surface with a continuous vapor deposition apparatus. The vapor permeability of the resulting films was measured with a vapor permeability tester PERMATRAN-W 3/30 produced by Modern Controls under conditions of 40° C. and 90% RH. The results are shown in Table 6. The films of Examples 13 and 14 exhibited a superior gas barrier property. In contrast, the gas barrier property in Example 8 was inferior.

TABLE 6

|  | Vapor permeability of transparent vapor deposition gas barrier (g/m² · day) |
| --- | --- |
| Example 13 | 1.1 |
| Example 14 | 1.3 |
| Comparative Example 8 | 3.6 |

INDUSTRIAL APPLICABILITY

The polyester film of the present invention has an impact resistance and a flex pinhole resistance sufficient for packaging material, and further exhibits superior gas barrier properties after a metal or metal oxide is deposited, with the inherent characteristics of polyester film maintained, such as low hygroscopicity, dimensional stability, flatness, and transparency. Accordingly, the polyester film can be suitably used in food packaging and other applications.

The invention claimed is:

1. A polyester film comprising a polyester resin containing an ethylene terephthalate component, a butylene terephthalate component, and a polyoxyalkylene glycol component, wherein the polyester resin comprises a polyester mainly composed of a repeating unit comprising ethylene terephthalate; a polyester mainly composed of a repeating unit comprising butylene terephthalate; and a block copolymer constituted of poly(ethylene terephthalate) or poly (butylene terephthalate) and a polyester of the polyoxyalkylene glycol and a dicarboxylic acid component; and wherein the content of the ethylene terephthalate component is in the range of 60% to 90% by weight relative to the total amount of the ethylene terephthalate component, the butylene terephthalate component, and the polyoxyalkylene glycol component, the content of the butylene terephthalate component is in the range of 10% to 40% by weight relative to the total amount of the ethylene terephthalate component, the butylene terephthalate component, and the polyoxyalkylene glycol component, and the content of the polyoxyalkylene glycol component is in the range of 0.1% to 5% by weight relative to of the total amount of the ethylene terephthalate component, the butylene terephthalate component, and the polyoxyalkylene glycol component.

2. The polyester film according to claim 1, wherein the content of the polyoxyalkylene glycol component in the polyester resin is in the range of 0.1% to 3% by weight.

3. The polyester film according to claim 1, wherein the polyoxyalkylene glycol is poly (tetramethylene glycol).

4. The polyester film according to claim 1, wherein the polyether-ester has a glass transition temperature in the range of −120 to 0° C.

5. The polyester film according to claim 1, wherein the polyester mainly composed of a repeating unit comprising ethylene terephthalate has an intrinsic viscosity in the range of 0.55 to 0.75; and the polyester mainly composed of a repeating unit comprising butylene terephthalate has an intrinsic viscosity in the range of 0.80 to 1.35.

6. The polyester film according to claim 1, wherein the polyester film has a tear propagation resistance of 8 kN/m or more in the longitudinal direction thereof.

7. The polyester film according to claim 1, wherein the polyester film has an elastic modulus in the range of 3 to 7 GPa in the longitudinal direction thereof.

8. The polyester film according to claim 1, wherein the Vickers hardness thereof measured at a depth of 0.2 µm with a thin-film hardness tester is in the range of 100 to 500 MPa.

9. The polyester film according to claim 1, wherein no melting point is observed in the range of 150 to 235° C. when the film is melted, cooled, and reheated.

10. The polyester film according to claim 1, wherein the polyether-ester has a plane orientation coefficient in the range of 0.10 to 0.16.

11. The polyester film according to claim 1, wherein the polyester film has a thickness in the range of 5 to 50 µm and a haze in the range of 0.1% to 5%.

12. The polyester film according to claim 1, wherein the polyester film is used for packaging.

13. The polyester film according to claim 1, wherein the polyester film is biaxially oriented.

14. A gas barrier polyester film comprising: the polyester film as set forth in claim 1 and a layer deposited on at least one surface of the polyester film, the layer comprising at least one metal compound selected from the group consisting of metallic aluminum, aluminum oxide, and silicon oxide.

15. A polyester film comprising a polyester resin containing an ethylene terephthalate component, a butylene terephthalate component, and a polyoxyalkylene glycol component, wherein the content of the ethylene terephthalate component is in the range of 60% to 90% by weight relative to the total amount of the ethylene terephthalate component, the butylene terephthalate component, and the polyoxyalkylene glycol component, the content of the butylene terephthalate component is in the range of 10% to 40% by weight relative to the total amount of the ethylene terephthalate component, the butylene terephthalate component, and the polyoxyalkylene glycol component, and the content of the polyoxyalkylene glycol component is in the range of 0.1% to 5% by weight relative to of the total amount of the ethylene terephthalate component, the butylene terephthalate component, and the polyoxyalkylene glycol component, wherein the polyoxyalkylene glycol component is added in a form of polyether-ester being a block copolymer with a polyester.

16. The polyester film according to claim 15, wherein the polyether-ester has a glass transition temperature in the range of −120 to 0° C.

17. The polyester film according to claim 15, prepared by blending: a polyester mainly composed of a repeating unit comprising ethylene terephthalate, having an intrinsic viscosity in the range of 0.55 to 0.75; a polyester mainly composed of a repeating unit comprising butylene terephthalate, having an intrinsic viscosity in the range of 0.80 to 1.35; and a polyester block-copolymerized with the polyoxyalkylene glycol component.

18. A polyester film comprising a polyester resin containing an ethylene terephthalate component, a butylene terephthalate component, and a polyoxyalkylene glycol component, wherein the content of the ethylene terephthalate component is in the range of 60% to 90% by weight relative to the total amount of the ethylene terephthalate component, the butylene terephthalate component, and the polyoxyalkylene glycol component, the content of the butylene terephthalate component is in the range of 10% to 40% by weight relative to the total amount of the ethylene terephthalate component, the butylene terephthalate component, and the polyoxyalkylene glycol component, and the content of the polyoxyalkylene glycol component is in the range of 0.1% to 5% by weight relative to of the total amount of the ethylene terephthalate component, the butylene terephthalate component, and the polyoxyalkylene glycol component, wherein the polyester film has a tear propagation resistance of 8 kN/m or more in the longitudinal direction thereof.

19. A polyester film comprising a polyester resin containing an ethylene terephthalate component, a butylene terephthalate component, and a polyoxyalkylene glycol component, wherein the content of the ethylene terephthalate component is in the range of 60% to 90% by weight relative to the total amount of the ethylene terephthalate component, the butylene terephthalate component, and the polyoxyalkylene glycol component, the content of the butylene terephthalate component is in the range of 10% to 40% by weight relative to the total amount of the ethylene terephthalate component, the butylene terephthalate component, and the polyoxyalkylene glycol component, and the content of the polyoxyalkylene glycol component is in the range of 0.1% to 5% by weight relative to of the total amount of the ethylene terephthalate component, the butylene terephthalate component, and the polyoxyalkylene glycol component, wherein the polyester film has an elastic modulus in the range of 3 to 7 GPa in the longitudinal direction thereof.

20. A polyester film comprising a polyester resin containing an ethylene terephthalate component, a butylene terephthalate component, and a polyoxyalkylene glycol component, wherein the content of the ethylene terephthalate component is in the range of 60% to 90% by weight relative to the total amount of the ethylene terephthalate component, the butylene terephthalate component, and the polyoxyalkylene glycol component, the content of the butylene terephthalate component is in the range of 10% to 40% by weight relative to the total amount of the ethylene terephthalate component, the butylene terephthalate component, and the polyoxyalkylene glycol component, and the content of the polyoxyalkylene glycol component is in the range of 0.1% to 5% by weight relative to of the total amount of the ethylene terephthalate component, the butylene terephthalate component, and the polyoxyalkylene glycol component, wherein the Vickers hardness thereof measured at a depth of 0.2 μm with a thin-film hardness tester is in the range of 100 to 500 MPa.

* * * * *